United States Patent [19]
Chen et al.

[11] Patent Number: 5,938,822
[45] Date of Patent: Aug. 17, 1999

[54] SOLID ELECTROLYTE MEMBRANE WITH POROUS CATALYTICALLY-ENHANCING CONSTITUENTS

[75] Inventors: Chieh Cheng Chen, Getzville; Ravi Prasad, East Amherst; Christian Friedrich Gottzmann, Clarence, all of N.Y.

[73] Assignee: Praxair Technology, Inc., Danbury, Conn.

[21] Appl. No.: 08/850,672

[22] Filed: May 2, 1997

[51] Int. Cl.$^6$ .......................... B01D 53/22; B01D 71/02
[52] U.S. Cl. ...................... 96/11; 95/54; 55/524
[58] Field of Search ................ 55/524; 95/54; 96/4, 11, 12

[56] References Cited

U.S. PATENT DOCUMENTS

| | | | |
|---|---|---|---|
| 4,791,079 | 12/1988 | Hazbun | 502/4 |
| 5,108,465 | 4/1992 | Bauer et al. | 95/54 |
| 5,160,713 | 11/1992 | Mazanec et al. | 95/54 X |
| 5,240,473 | 8/1993 | Carolan et al. | 95/54 |
| 5,240,480 | 8/1993 | Thorogood et al. | 96/4 |
| 5,269,822 | 12/1993 | Carolan et al. | 95/54 |
| 5,306,411 | 4/1994 | Mazanec et al. | 204/265 |
| 5,342,431 | 8/1994 | Anderson et al. | 96/4 X |
| 5,534,471 | 7/1996 | Carolan et al. | 95/54 X |
| 5,547,494 | 8/1996 | Prasad et al. | 95/54 |
| 5,569,633 | 10/1996 | Carolan et al. | 502/4 |
| 5,582,710 | 12/1996 | Mairesse et al. | 205/634 |
| 5,599,383 | 2/1997 | Dyer et al. | 96/11 X |
| 5,616,223 | 4/1997 | Shen et al. | 204/295 |
| 5,624,542 | 4/1997 | Shen et al. | 204/283 |
| 5,648,304 | 7/1997 | Mazanec et al. | 96/4 X |
| 5,681,373 | 10/1997 | Taylor et al. | 96/11 |
| 5,712,220 | 1/1998 | Carolan et al. | 95/54 X |

FOREIGN PATENT DOCUMENTS

WO92/00934  1/1992  WIPO.

OTHER PUBLICATIONS

Oe, K.I., et al.–"Toughening of Ionic Conductive Zirconia Ceramics Utilizing A Non–Linear Effect", Solid State Ionics, vol. 1–2, No. 91, Oct. 1, 1996, pp. 131–136, XP004071614.

Bamba, N., et al.–"Fabrication and Mechanical Properties of Nanosized SiC Particulate Reinforced Yttria Stabilized Zirconia Composites", Nanostructured Materials, vol. 1–8, No. 9, 1997, pp. 497–500 XP004065183.

Van de Goor, G., et al. –"Electrically Conductive Ceramic Composites", Solid State Ionics, vol. 2002, No. 101–103, Nov. 1997, pp. 1163–1170, XP–004103752.

"Development of Oxygen Semipermeable Membrane Using Mixed Conductive Perovskite–Type Oxides (Part I)", Y. Teraoka, et al., J. Ceram. Soc. Jpn. Inter. Ed., vol. 97 (458–462) (1989).

"Preparation of Dense Film of Perovskite–Type Oxide on Porous Substrate", Y. Teraoka, et al., J. Ceram. Soc. Jpn. Inter. Ed. vol. 97 (523–529) (1989).

*Primary Examiner*—Robert Spitzer
*Attorney, Agent, or Firm*—Bernard Lau

[57] ABSTRACT

A solid electrolyte ion transport membrane composite for separating a gaseous species from a gaseous mixture in which the composite has a dense matrix material and a porous coating. The dense membrane is comprised of a matrix material which conducts at least one type of ion, and at least one membrane constituent. The porous coating is disposed on the membrane to enhance the rate of surface reactions involving the gaseous species.

20 Claims, 1 Drawing Sheet

5,938,822

SOLID ELECTROLYTE MEMBRANE WITH POROUS CATALYTICALLY-ENHANCING CONSTITUENTS

U.S. GOVERNMENT RIGHTS

This invention was made with United States Government support under Cooperative Agreement No. 70NANB5H1065 awarded by the National Institute of Standards and Technology. The United States Government has certain rights in the invention.

FIELD OF THE INVENTION

This invention relates to a solid electrolyte ion transport membrane composite for separating a gaseous species from a gaseous mixture and more particularly to a dense ion transport membrane having a porous coating disposed thereon to enhance the rate of surface reactions involving the gaseous species.

BACKGROUND OF THE INVENTION

Solid electrolyte ion conductive transport membranes have significant potential for the separation of oxygen from oxygen-containing gas. Membranes that are of particular interest include mixed conductor materials that conduct both oxygen ions and electrons and which can operate in a pressure driven mode without the use of external electrodes. Certain mixed conductor membranes are known in the art. For example, composite ceramic mixed conductor membranes comprised of multiphase mixtures of an electronically-conductive material and an oxygen ion conductive material for electrochemical reactors and partial oxidation reactions have been disclosed by T. J. Mazanec et al. in U.S. Pat. No. 5,306,411. Composite mixed conductor materials containing oxygen ion-conducting materials such as bismuth oxide and electronically conductive materials have been disclosed by M. Liu et al. in U.S. Pat. No. 5,478,444. True mixed conductors, exemplified by perovskites such as $La_{1-x}Sr_xCoO_{3-y}$, $La_xSr_{1-x}FeO_{3-y}$, $La_xSr_{1-x}Fe_{1-y}Co_yO_{3-z}$ and others, are materials that possess intrinsic conductivity for both electrons and ions.

Oxygen transport is driven by the partial pressure of the oxygen in the gas streams. The Nernst potential is developed internally, and drives the flux of oxygen vacancies against the ionic resistance of the electrolyte as disclosed in commonly assigned U.S. Pat. No. 5,547,494 by Prasad et al. entitled "Staged Electrolyte Membrane", which is incorporated herein by reference.

Generally, thin electrolyte films are desirable because the ideal oxygen flux is inversely proportional to their thickness. Thus, thinner films lead to higher oxygen fluxes, reduced area, lower operating temperatures and lower oxygen pressure differentials across the electrolytes. Also, when the anode-side of the membrane is purged with a reactive gas, such as methane or hydrogen, the oxygen activity on the anode side reduces significantly, thus leading to higher oxygen flux across the membrane. However, as the oxygen flux increases, the surface resistance to transport become more pronounced and ultimately dominate the overall resistance to transport. Surface resistance arise from various mechanisms involved in converting an oxygen molecule in the gas phase to oxygen ions in the crystal lattice and vice versa. Even for dense ion transport membranes, surface kinetics on the cathode or the anode side may limit the oxygen flux across the membrane.

Yasutake Teraoka et al. reported solid state gas separation membranes formed by depositing a dense mixed conducting oxide layer onto a porous mixed conducting support in Jour. Ceram. Soc. Japan. International Ed., Vol.97, No.4, pp.458–462 and No.5, pp.523–529 (1989). The relatively thick porous mixed conducting support provides mechanical stability for the thin, relatively fragile dense mixed conducting layers. Considering the thickness of the dense layer, the authors therein expected the oxygen flux to increase by a factor of ten for the composite thin film membrane as compared to a dense mixed conducting disk. However, they obtained an increase in oxygen flux of less than a factor of two using the thin film membrane.

Terry J. Mazanec et al. described solid multicomponent membranes comprised of gas impervious, multi-phase mixtures of an electronically-conductive phase and an oxygen ion-conductive phase and/or gas impervious, single phase mixed metal oxides having a perovskite structure and having both electron-conductive and an oxygen ion-conductive properties in U.S. Pat. No. 5,306,411. Dual phase electronic-ionic conductive material (generally requires electronic second phase of more than 30 vol. % to form a continuous second phase to enable operation above the percolation limit) for membranes was discussed. Dual phase electronic-mixed conductive material (second phase of less than 30 vol. % is dispersed in the mixed conductor matrix to enhance mechanical and catalytic properties) is described in commonly assigned U.S. Ser. No. 08/444,354 entitled "Solid Electrolyte Membrane with Mechanically Enhanced Constituents," and is hereby incorporated by reference.

It has been reported that ceramic membranes comprised of a mixed conducting perovskite with a porous coating of metal, metal oxide or combinations thereof increases the kinetic rate of the feed side interfacial fluid exchange, the kinetic rate of the permeate side interfacial exchange, or both.

U.S. Pat. No. 4,791,079 discloses catalytic ceramic membranes consisting of two layers, an impervious mixed ion and electronic conducting ceramic layer and a porous catalyst-containing ion conducting ceramic layer. The preferred composition for the porous ceramic layer is zirconia stabilized with approximately 8 to 15 mole percent calcia, yttria, scandia, magnesia, and/or mixtures thereof.

U.S. Pat. No. 5,240,480 discloses multi-layer composite solid state membranes, comprising a multicomponent metallic oxide porous layer and dense layer, which are capable of separating oxygen from oxygen-containing gaseous mixtures at elevated temperature.

U.S. Pat. No. 5,569,633 discloses surface catalyzed multi-layer ceramic membranes consisting of a dense mixed conducting multicomponent metallic oxide layer, and a catalyzed metal or metal oxide coating on the feed (air) side to enhance the oxygen flux. Catalytic coating on both sides did not enhance the oxygen flux.

OBJECTS OF THE INVENTION

It is therefore an object of the invention to provide solid electrolyte ion transport membrane that substantially decreases limitations imposed by the surface kinetics and/or chemical kinetics to obtain high oxygen flux.

It is a further object of this invention to provide such a membrane having a modified surface which has an improved catalytic effect on the membrane.

SUMMARY OF THE INVENTION

This invention comprises a solid electrolyte ion transport membrane composite for separating a gaseous species from a gaseous mixture in which the composite has a dense matrix material and a porous coating. The dense membrane has a first surface and a second surface, and is comprised of a matrix material which conducts at least one type of ions, and at least one membrane constituent which is physically distinguishable from the matrix material, enhances at least one of the mechanical properties, catalytic properties and sintering behaviors of the matrix material, and is present in a manner which precludes continuous electronic conductivity through the membrane constituent across the membrane. The porous coating is disposed on at least one of the first and second surfaces of the membrane to enhance the rate of surface reactions involving the gaseous species.

In a preferred embodiment, the matrix material and coating material are mixed conductors which exhibit both electronic and oxygen ion conductivity. The constituent comprises a metal present in a manner below the percolation limit across the membrane.

As used herein, the term "dual phase" refers to the combination of a phase which conducts at least one type of ion, and a phase comprising the constituent.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

This invention may be accomplished by a solid electrolyte ion transport membrane composite having a dense membrane and a porous coating for separating a gaseous component from a gaseous mixture. The dense membrane has a first surface and a second surface, and is comprised of a matrix material which conducts at least one type of ions, and includes a constituent which enhances at least one of the mechanical properties, catalytic properties and sintering behaviors of the matrix material, and is present in a manner which precludes continuous electronic conductivity through the membrane constituent across the membrane. The porous coating is deposited on at least one of the first and second surfaces of the membrane to enhance the rate of surface reactions involving the gaseous species.

The invention introduces a porous coating onto a multiphase dense solid electrolyte ion transport membrane to establish a composition with improved catalytic properties by enhancing the surface kinetic exchange to the dense membrane. The porous coating provides a significantly enhanced catalytic activity or surface exchange rate over the dense electrolyte transport membrane alone.

As used herein, the term "ion transport material" is interchangeable with matrix material.

The porous coating layer is deposited on the reactive surface of the dense membrane. For the purpose of illustration, when purging the anode side of the composite membrane according to the present invention using a methane containing gas, the surface reaction rate of methane can be greatly increased by affording greater surface area to the membrane surface. This is particularly true for depositing the porous layer on the anode side of the membrane, as the rate limiting step generally reside on the anode side of the membrane when methane is the reacting component of the purge gas. There may be certain chemical reactions in which the rate limiting step reside on the cathode side of the membrane. In such a case, the porous coating is deposited on at least the cathode side.

As a preferred embodiment, the coating is deposited on the surfaces of both the anode and cathode side. This is particularly preferred because of the ease in manufacturing dual-coated dense membranes.

Figure 1:
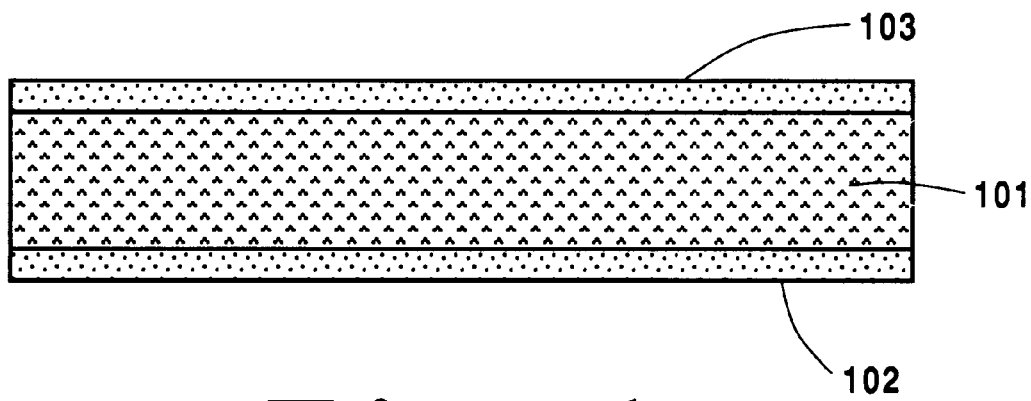
FIG. 1 is an enlarged cross-sectional view of a dense solid electrolyte ion transport membrane having a porous crystalline layer coating to enhance surface reactions according to the present invention.
Figure 2:
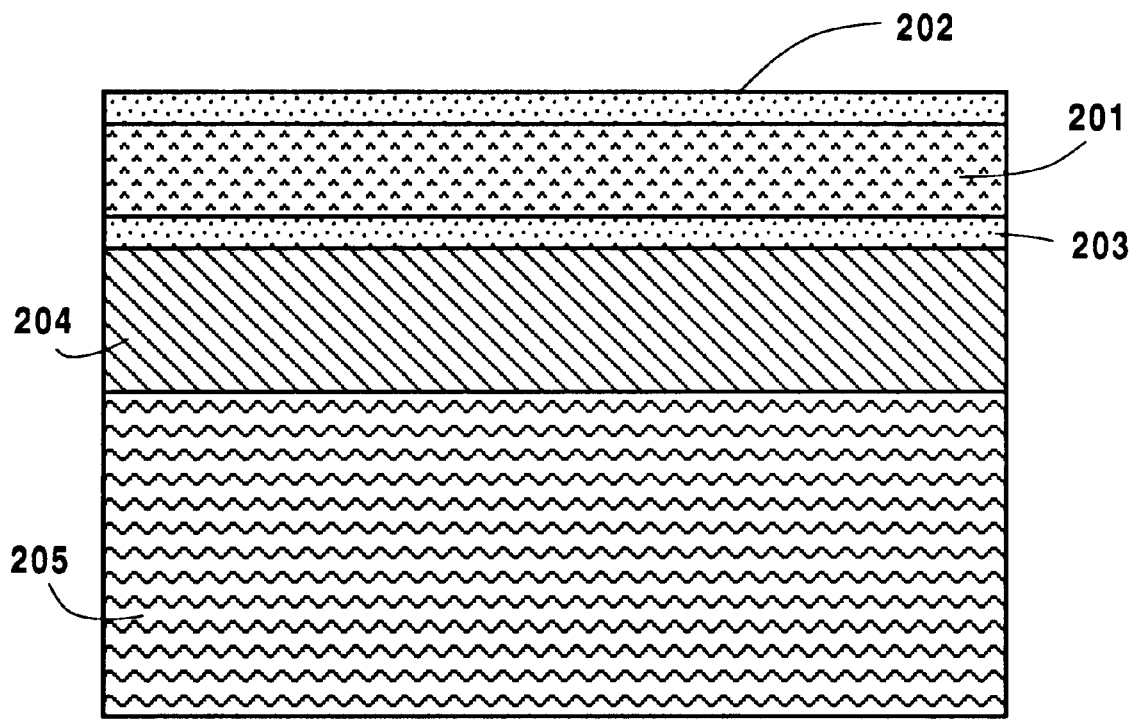
FIG. 2 is an enlarged cross-sectional view of a solid electrolyte ion transport membrane composite having a porous crystalline layer coating on both sides of the dense membrane to enhance surface reactions, and in which one of the porous coatings is disposed on a porous support for enhancing the mechanical strength of the composite.

The drawings are representative of certain embodiments of the solid electrolyte ion transport membrane composite of this invention. FIG. 1 shows porous coating layers 102 and 103 deposited on both surfaces of dense solid electrolyte ion conducting membrane 101. FIG. 2 shows another embodiment in which porous coating layers 202 and 203 are deposited on both surfaces of dense solid electrolyte ion conducting membrane 201. Membrane 201 is supported on a porous support comprising intermediate support layer 204 and support layer 205, with porous coating layer 203 between membrane 201 and intermediate support layer 204.

Although numerous techniques for depositing a layer of material onto a dense surface are available, one preferred manufacturing process comprises dipping the dense membrane into a liquid precursor of the porous coating (e.g., slurry, colloidal solution), and subsequently drying and curing the resulting coating layer. This method is a comparatively easier and more cost effective method for depositing a porous coating layer onto a dense surface over other methods available in the art.

Depositing a coating layer onto both sides of the dense matrix material balances the coatings to prevent or reduce the possible effects of mechanical stress on the membrane surface. When cured, the porous coating layer may produce mechanical stress on one side of the dense matrix material if the coating occurs only on one side. Accordingly, it is preferred to deposit a coating layer on both sides of the dense matrix material to reduce unbalanced stress as a result of the coating.

Examples of dense membrane materials are given in Table I below and include several oxides with a perovskite structure or a structure that can be derived from such compounds as $A_2B_2O_5$, a brownmillerite. A common problem of such ceramic membranes is their fragility and low mechanical strength, which makes it difficult to fabricate large elements such as tubes, and to use them with high reliability in commercial systems. These limitations are overcome using multiphase materials, for example, a dual phase material comprised of a mixed conductor such as a perovskite and a constituent material as disclosed in commonly assigned U.S. Ser. No. 08/775,683, filed Dec. 31, 1996, entitled "Solid Electrolyte Membrane with Mechanically-Enhancing Constituents" which is incorporated herein by reference.

Suitable ion transport membrane materials include mixed conductors that can transport oxygen ions. As used according to the present invention, the mixed conductor phase may transport both oxygen ions and electrons independent of the presence of the second electronic conducting phase. Examples of mixed conducting solid electrolytes of this invention are provided in Table I below, but this invention is not limited solely to these material compositions listed therein. Dense matrix materials other than those comprised only of mixed conductors are also contemplated by this invention.

In general, the major considerations in the selection of the constituent are: (1) thermal expansion coefficient (TEC) match between the constituent and the ion transport material; (2) chemical compatibility between the constituent and the ion transport material; (3) good bonding between the constituent and the matrix of the ion transport material; (4) the ductility of the constituent to release the stresses during sintering and cooling; and (5) low cost. TEC match is important because stresses are usually set up within and around the constituent as the membrane cools down or heats up, e.g., during fabrication or operation. Selection of an incorrect constituent may cause possible delamination or cracking by the thermal stresses induced during fabrication and operation. This can be minimized by reducing the difference in the expansion coefficients between the matrix material and the constituent.

Chemical compatibility is important because the high temperature operation and processing of ion transport materials will cause interactions and interdiffusion between the ion transport material and the constituent that may lead to the degradation of the materials and reduce the membrane performance. Therefore, the constituent should be chemically inert towards or should not react undesirably with the ion transport material to prevent adverse interactions and interdiffusion at high temperatures.

Good bonding is important because delaminations occurring between the second phase and the ion transport material could be deleterious to the strength of the material. Cracks or flaws could easily link up and cause a failure of the material.

Ductility of the constituent is important because many ion transport materials have very high thermal expansion coefficient. High TEC's give rise to high thermal stress during the processing and operation of the ion transport materials, which may result in failure of the materials. The ductility of the second phase may release the stresses generated during sintering and/or cooling.

In addition to the above considerations, the catalytic activity of the second phase preferably improves surface reaction kinetics of the composite ion transport membranes. Increased catalytic activity therefore may mitigate an otherwise higher cost for a given electronic conducting phase.

The constituent can be chosen from metals, such as silver, palladium, platinum, gold, rhodium, titanium, nickel, ruthenium, tungsten, tantalum, or alloys of two or more of such metals which are stable at membrane operating temperatures. Suitable high-temperature alloys include inconel, hastelloy, monel, and ducrolloy. Silver, palladium, or silver/palladium alloy are preferred. The constituent can be also chosen from ceramics, such as praseodymium-indium oxide mixture, niobium-titanium oxide mixture, titanium oxide, nickel oxide, tungsten oxide, tantalum oxide, ceria, zirconia, magnesia, or a mixture thereof. Some ceramic constituents, such as titanium oxide or nickel oxide, can be introduced in the form of oxides, then reduced to metal during the operation under a reduction atmosphere.

This invention is directed to coating a dense membrane by depositing the porous coating on at least one surface of the membrane. The coating modifies the surface of the membrane, thus believed to provide a catalytic effect during ion transport as well as providing structural stability on the surface layer.

Suitable ion transport membrane materials include mixed conductors that can transport oxygen ions. As used according to the present invention, the mixed conductor phase may transport both oxygen ions and electrons independent of the presence of the second electronic conducting phase. Examples of mixed conducting solid electrolytes of this invention are provided in Table I below, but this invention is not limited solely to these material compositions listed therein. Dense matrix materials other than those comprised only of mixed conductors are also contemplated by this invention.

Suitable coating compositions may comprise of mixed conducting oxides that transport oxide ion as well as electron conductivity. Examples of the porous coating mixed conductor are given in Table I below, and may be the same or different from the mixed conducting oxides of the dense membrane. As in the dense membrane, the coating may comprise a composition having a mixed conductor phase and a coating constituent.

TABLE I

Mixed Conducting Solid Electrolytes

Material composition

1. $(La_{1-x}Sr_x)(Co_{1-y}Fe_y)O_{3-\delta}$ ($0 \leq x \leq 1$, $0 \leq y \leq 1$, $\delta$ from stoichimetry)
2. $SrMnO_{3-\delta}$
   $SrMn_{1-x}Co_xO_{3-\delta}$ ($0 \leq x \leq 1$, $\delta$ from stoichimetry)
   $Sr_{1-x}Na_xMnO_{3-\delta}$
3. $BaFe_{0.5}Co_{0.5}YO_3$
   $SrCeO_3$
   $YBa_2Cu_3O_{7-\beta}$ ($0 \leq \beta \leq 1$, $\beta$ from stoichimetry)
4. $La_{0.2}Ba_{0.8}Co_{0.8}Fe_{0.2}O_{2.6}$; $Pr_{0.2}Ba_{0.8}Co_{0.8}Fe_{0.2}O_{2.6}$
5. $A_xA'_{x'}A''_{x''}B_yB'_{y'}B''_{y''}O_{3-z}$ ($x, x', x'', y, y', y''$ all in 0–1 range)
   where: A, A', A" = from groups 1, 2, 3 and f-block lanthanides
   B, B', B" = from d-block transition metals
6. (a) Co—La—Bi type:  Cobalt oxide      15–75 mole %
                       Lanthanum oxide   13–45 mole %
                       Bismuth oxide     17–50 mole %
   (b) Co—Sr—Ce type:  Cobalt oxide      15–40 mole %
                       Strontium oxide   40–55 mole %
                       Cerium oxide      15–40 mole %
   (c) Co—Sr—Bi type:  Cobalt oxide      10–40 mole %
                       Strontium oxide    5–50 mole %
                       Bismuth oxide     35–70 mole %
   (d) Co—La—Ce type:  Cobalt oxide      10–40 mole %
                       Lanthanum oxide   10–40 mole %
                       Cerium oxide      30–70 mole %
   (e) Co—La—Sr—Bi type: Cobalt oxide    15–70 mole %
                       Lanthanum oxide    1–40 mole %
                       Strontium oxide    1–40 mole %
                       Bismuth oxide     25–50 mole %

TABLE I-continued

Mixed Conducting Solid Electrolytes

Material composition (f) Co—La—Sr—Ce type:  Cobalt oxide      10–40 mole %
                        Lanthanum oxide   1–35 mole %
                        Strontium oxide   1–35 mole %
                        Cerium oxide      30–70 mole %

7. $Bi_{2-x-y}M'_xM_yO_{3-\delta}$ ($0 \leq x \leq 1$, $0 \leq y \leq 1$, $\delta$ from stoichiometry)
   where: M' = Er, Y, Tm, Yb, Tb, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$ where, x equals from zero to about 1.
9. One of the materials of $A_sA'_tB_uB'_vB''_wO_x$ family whose composition is disclosed in U.S. Pat. No. 5,306,411 (Mazanec et al.) as follows:
   A represents a lanthanide or Y, or a mixture thereof;
   A' represents an alkaline earth metal or a mixture thereof;
   B represents Fe;
   B' represents Cr or Ti, or a mixture thereof;
   B" represents Mn, Co, V, Ni or Cu, or a mixture thereof;
   and s, t, u, v, w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A', B, B', B" in the formula; and $0.9 < (s + t)/(u + v + w) < 1.1$
10. One of the materials of $La_{1-x}Sr_xCu_{1-y}M_yO_{3-\delta}$ family, where:
    M represents Fe or Co;
    x equals from zero to about 1;
    y equals from zero to about 1;
    $\delta$ equals a number that satisfies the valences of La, Sr, Cu, and M in the formula.
11. One of the materials of $Ce_{1-x}A_xO_{2-\delta}$ family, where:
    A represents a lanthanide, Ru, or Y; or a mixture thereof;
    x equals from zero to about 1;
    $\delta$ equals a number that satisfies the valences of Ce and A in the formula.
12. One of the materials of $Sr_{1-x}Bi_xFeO_{3-\delta}$ family, where:
    A represents a lanthanide or Y, or a mixture thereof;
    x equals from zero to about 1;
    $\delta$ equals a number that satisfies the valences of Sr, Bi and Fe in the formula.
13. One of the materials of $Sr_xFe_yCo_zO_w$ family, where:
    x equals from zero to about 1;
    y equals from zero to about 1;
    z equals from zero to about 1;
    w equals a number that satisfies the valences of Sr, Fe and Co in the formula.
14. Dual phase mixed conductors (electronic/ionic):

$(Pd)_{0.5}/(YSZ)_{0.5}$
    $(Pt)_{0.5}/(YSZ)_{0.5}$
    $(B-MgLaCrO_x)_{0.5}(YSZ)_{0.5}$
    $(In_{90\%}Pt_{10\%})_{0.6}/(YSZ)_{0.5}$
    $(In_{90\%}Pt_{10\%})_{0.5}/(YSZ)_{0.5}$
    $(In_{95\%}Pr_{2.5\%}Zr_{2.5\%})_{0.5}/(YSZ)_{0.5}$
    Any of the materials described in 1–13, to which a high temperature metallic phase (e.g., Pd, Pt, Ag, Au, Ti, Ta, W) is added.

Suitable porous coating compositions include a combination of a mixed conductor and a coating constituent that can transport oxygen ions and/or electrons. The mixed conductors may transport both oxygen ions and conduct electrons independent of the presence of the coating constituent. It is preferred that the coating constituent constitute less than about thirty percent by volume of the total porous coating.

The porous coating may be coated using various methods known to the skilled artisan. A preferred method is the slurry dip coating procedure. This method is preferred because of the ease and cost efficiency of coating the dense membrane. Other methods may include spin coating, chemical vapor deposition (CVD), electrochemical vapor deposition (EVD), physical vapor deposition (PVD) such as laser ablation and sputtering, thermal spray, plasma spray, RF plasma deposition and a combination thereof.

The layer of porous coating should be thin relative to the surface of the dense membrane, such that the coating enhances the rate of surface reaction of the dense membrane. Accordingly, the porous coating layer has a thickness of less than about 50 microns, preferably less than 10 microns, and more preferably less than 5 microns.

A more comprehensive description of the porous coating according to the present invention is provided in the examples below.

In another embodiment, a porous support can also be used to enhance the structural stability of the membrane. The porous support may include inert, ionic conducting, mixed conducting and electronic conducting (metallic) material, or a combination thereof. Additionally, the porous support may contain catalytically enhancing constituents in combination with any of the inert, ionic conducting, mixed conducting and electronic conducting material, or a combination thereof. The porous support is particularly important where the dense matrix material is thin and fragile. Structurally, it is preferable to have at least one of the dense membrane and the porous coating being deposited on the porous support. An example of this embodiment is found in FIG. 2.

EXAMPLE 1

A single-phase dense $La_{0.2}Sr_{0.8}Fe_{0.69}CO_{0.1}Cr_{0.2}Mg_{0.01}O_x$ ("LSFCCM") powder (SSC) solid electrolyte ion conducting tube (7.1 mm ID, 9.7 mm OD, and approximately 15 cm long) was extruded, then sintered at 1250° C. in nitrogen for 1 hour with a heating/cooling rate of 2° C./min. To test oxygen permeation across the tube, the following procedure was used: a purge gas (containing 60% $CH_4$, 10% $CO_2$ and 30% inert gas such as $N_2$ or Ar bubbled through water) flowed inside the tubes countercurrent to the feed gas. A thermocouple located halfway down the ion transport membrane tube monitored the temperature of the purge gas flowing through the tube, which is referred to as "ion transport temperature" in this discussion. Oxygen in the feed gas was partly removed by permeation across the ion transport membrane, and an oxygen-lean product was obtained. Feed $O_2$ volume fraction ($x_F$), product $O_2$ volume fraction ($x_p$), and product volumetric flow rate ('P' sccm) were measured and the feed volumetric flow (F) used in the permeation test was computed by the following mass balance on nonpermeating species: $P \cdot (1-x_p) = F \cdot (1-x_F)$. $O_2$ flux across the ion transport tubes was then computed using the following equation:

$$O_2\text{-flux} = (F \cdot x_F - P \cdot x_p)/A_{ion\ transport}$$

where, $A_{ion\ transport}$ = average ion transport tube area across which $O_2$ is transported (cm$^2$)

EXAMPLE 2

Example 2 presents an embodiment of the electrolyte membrane of the present invention. A single-phase dense LSFCCM solid electrolyte ion conducting tube similar to that of Example 1 was prepared. The tube was coated with a slurry dip coating procedure via Chemat Technology Model 201 to deploy a porous layer of approximately 1 μm size granules of a single-phase LSFCCM ion transport material on both surfaces of the tube.

The coated material was then tested under the same manner as that described in Example 1. Enhancement of $O_2$ flux across the ion transport membrane with the aid of a porous coating is illustrated by the following table based on the experimental data. In the experiments performed under similar conditions, the coated ion transport tube showed a substantially higher $O_2$ flux (4 times) than the uncoated ion transport tube. In this case, data points with similar feed flow rates are shown. The coated single-phase tube was observed to remove more oxygen from similar feed-streams.

Note that the feed $O_2$ volume fraction used in the coated tube tests was slightly higher than the uncoated tube tests. However, according to Wagner's theory, the $O_2$-flux depends on the logarithm of the feed $O_2$ volume fraction: thus a change from 20.9 volume % to 22.6 volume % of $O_2$ in the feed stream is not expected to significantly affect the average flux reported in the following table.

TABLE II

Results for single-phase ion transport tube

| Tube area (cm$^2$) | $O_2$ in feed | O2 in prod. | Calc. feed flow (sccm) | Prod. flow (sccm) | ion transport temp. (° C.) | Avg. Flux (sccm/cm$^2$) |
|---|---|---|---|---|---|---|
| Uncoated single-phase ion transport tube (Example 1): | | | | | | |
| 38.5 | 20.9% | 17.41% | 329 | 315 | 1,001 | 0.4 |
| Single-phase ion transport tube with a 20 μm porous coating of 1 μm single-phase ion transport granules (Example 2): | | | | | | |
| 37.6 | 22.6% | 0.50% | 322 | 205 | 1,021 | 1.6 |

EXAMPLE 3

A dual-phase ion transport tube of LSFCCM with 20 wt % 50Ag/50Pd (50 wt. % Ag and 50 wt. % Pd) was made by slip casting. Dual phase LSFCCM ion transport membrane slip was prepared by mixing 20 wt % of the 50Ag/50Pd alloy (DeGussa) and $La_{0.2}Sr_{0.8}Fe_{0.69}CO_{0.1}Cr_{0.2}Mg_{0.01}O_x$ powder (SSC) and 2 drops Darvan C dispersant with water to a 35% solids concentration. The slip was milled for 5 hours, slipcast in a gypsum mold, then sintered at 1250° C. in air for 1 hour with a heating/cooling rate of 2° C./min. The dual-phase tube was tested in the same manner as that described in Example 1.

EXAMPLE 4

Example 4 presents another embodiment of the present invention. A dual-phase LSFCCM ion transport tube similar to that of Example 3 was prepared. The tube was coated using a slurry dip coating procedure via Chemat Technology Model 201 was used to deploy a porous layer of approximately 1 μm size granules of a single-phase LSFCCM ion transport material on both surfaces of one of the tubes, whereas the tube from Example 3 was left uncoated. Substantial $O_2$-flux enhancement (3.8 times) was observed with the porous single-phase ion transport layer deployed on the tubes. In this example, data points with similar product $O_2$ concentrations were chosen. A much higher feed flow could be used in the coated dual-phase tube to remove $O_2$ to a comparable extent.

EXAMPLE 5

Example 5 presents yet another embodiment of the present invention. An extruded dual-phase LSFCCM ion transport tube similar to that of Example 1 was prepared. The tube was coated using a slurry dip coating procedure via Chemat Technology Model 201 was used to deploy a porous layer of approximately 1 μm size granules of a dual phase LSFCCM ion transport material comprising LSFCCM and a constituent on both surfaces of one of the tubes. The constituent is made from 50Ag/50Pd and is about 20 wt. % (approximately 11 vol. %) of the entire porous layer. Substantial $O_2$-flux enhancement (3.7 times) was observed with the porous single-phase ion transport layer deployed on the tubes. In this example, data points with similar product $O_2$ concentrations were chosen. A much higher feed flow could be used in the coated dual-phase tube to remove $O_2$ to a comparable extent. It is also shown that substantial enhancement in O2 product, feed flow and product flow can be attained.

TABLE III

Results for dual-phase ion transport tube

| Tube area (cm²) | $O_2$ in feed | $O_2$ in prod. | Calc. feed flow (sccm) | Prod. flow (sccm) | ion transport temp. (° C.) | Avg. Flux (sccm/cm²) |
|---|---|---|---|---|---|---|
| A. Uncoated dual-phase ion transport tube (Example 3): | | | | | | |
| 17.5 | 20.9% | 5.57% | 209 | 175 | 1034 | 1.9 |
| B. Dual-phase ion transport tube with a 20μ porous coating of 1μ single-phase ion transport granules (Example 4): | | | | | | |
| 17.8 | 20.9% | 5.34% | 790 | 660 | 1062 | 7.3 |
| C. Dual-phase ion transport tube with a 20μ porous coating of 1μ dual-phase ion transport granules (Example 5): | | | | | | |
| 37.7 | 20.9% | 12.92% | 2884 | 2620 | 1017 | 7.0 |

Note that in each example the ion transport tube with the mixed conductor and electronic conductor porous layer, the oxygen flux increased nearly four times that of the dense uncoated ion transport tube.

EXAMPLE 6

A dual phase disc was prepared. Both surfaces of sintered discs were then polished to obtain a thickness of 0.9 mm. The oxygen permeation rate was measured on the disc at 900° C. under an air/helium gradient. The disc specimen was sealed in an alumina test cell with Ag paste. A HP 5890 Gas Chromatograph and oxygen analyzer were used to analyze the gas compositions and calculate the oxygen fluxes. The flux results (in sccm/cm²) at 900° C. are summarized in Table IV.

EXAMPLE 7

Example 7 presents another embodiment of the electrolyte membrane of the present invention. A dual phase disc similar to that of Example 6 was prepared and was polished to obtain a thickness of 0.6 mm.

A few drops of a LSFCCM ion transport material similar to that from Example 2 were deposited onto the surface of the disc which was fixed on a spinning coater. A spinning speed of 3500 rpm for 20 seconds was used for the deposition of modification layer. After spin-coating, the as-deposited coating of LSFCCM ion transport material on the disc was dried on a hot plate at 80° C. for 5 minutes, then transferred to a ceramic-top hot plate and heated at approximately 300° C. for at least 5 minutes. The entire coating and drying process was repeated until a 1 μm LSFCCM film formed on the membrane surface. The dual phase disc was then tested in the same manner as described in Example 6.

With the surface modification (on air side) the oxygen flux increased about three fold under an air/helium gradient indicating that surface exchange kinetics on the air is enhanced by increasing the surface area for oxygen dissociation via the surface modification.

TABLE IV

Results for dual-phase disc

| Disc area (cm²) | Disc thickness (mm) | Feed flow (sccm) | Purge flow (sccm) | ionic transport temp. (° C.) | $O_2$ flux (sccm/cm²) | Corr. $O_2$ flux (sccm/cm²) |
|---|---|---|---|---|---|---|
| Uncoated dual-phase disc (Example 6): | | | | | | |
| 3.9 | 0.9 | 500 | 500 | 900 | 0.07 | (0.06)* |
| Dual-phase disc with a 1 μm porous coating LSFCCM on air side (Example 7): | | | | | | |
| 3.9 | 0.6 | 500 | 500 | 900 | 0.26 | (0.16)* |

*(Flux corrected to 1 mm thick membrane)

Specific features of the invention are shown in one or more of the drawings for convenience only, as each feature may be combined with other features in accordance with the invention. Alternative embodiments will be recognized by those skilled in the art and are intended to be included within the scope of the claims. For example, suitable first phase materials may conduct proton ions instead of or together with oxygen ions for applications involving hydrogen.

What is claimed is:

1. A solid electrolyte ion transport membrane composite for separating a gaseous species from a gaseous mixture comprising:

a dense membrane having a first surface and a second surface, the membrane comprising a) a matrix material which conducts at least one type of ion, and b) at least one membrane constituent which is physically distinguishable from the matrix material, enhances at least one of the mechanical properties, catalytic properties and sintering behaviors of the matrix material, and is present in a manner which precludes continuous electronic conductivity through the membrane constituent across the membrane; and a porous coating disposed on at least one of the first and second surfaces of the membrane to enhance the rate of surface reactions involving the gaseous species, the porous coating including a coating material which is the same as the matrix material.

2. The composition of claim 1 wherein the matrix material and the coating material comprise a mixed conductor which exhibits both electronic and oxygen ion conductivity.

3. The composite of claim 1 wherein the membrane constituent comprises a metal present in a manner below the percolation limit of electrons across the membrane.

4. The composite of claim 1 wherein the membrane constituent is a ceramic material.

5. The composite of claim 1 wherein the porous coating includes a coating constituent which further enhances at least one of the mechanical properties, catalytic properties and sintering behaviors of the membrane composite.

6. The composite of claim 5 wherein the coating constituent is comprised of a metal.

7. The composite of claim 5 wherein the coating constituent is a ceramic material.

8. The composite of claim 5 wherein said porous coating has the same composition as the dense membrane.

9. The composite of claim 1 further including at least one of the dense membrane and the porous coating being disposed on a porous support for enhancing the structural stability of the membrane.

10. The composite of claim 9 wherein said porous coating has the same composition as the dense membrane.

11. The composite of claim 1 wherein said porous coating is disposed on both surfaces of the membrane.

12. A solid electrolyte ion transport membrane composite for separating oxygen from a gaseous mixture comprising:

a dense membrane having a first surface and a second surface, the membrane comprising 1) a matrix material which conducts at least oxygen ions, and 2) at least one metallic constituent which is physically distinct from the matrix material, the constituent being presented in a manner which precludes continuous electronic conductivity through said constituent across the membrane; and a porous coating disposed on at least one of the first and second surface of the membrane to enhance the rate of surface reactions involving the gaseous species, the porous coating including a coating material which is the same as the matrix material.

13. The composite of claim 12 wherein the matrix material and the coating material comprise a mixed conductor which exhibits both electronic and oxygen ion conductivity.

14. The composite of claim 12 wherein the membrane constituent comprises at least one metal present in a manner below the percolation limit of electrons across the membrane.

15. The composite of claim 12 wherein the porous coating includes a coating constituent which further enhances at least one of the mechanical properties, catalytic properties and sintering behaviors of the membrane composite.

16. The composite of claim 15 wherein said porous coating has the same composition as the dense membrane.

17. The composite of claim 12 further including at least one of the dense membrane and the porous coating being disposed on a porous support for enhancing the structural stability of the membrane.

18. The composite of claim 17 wherein said porous coating is disposed on both surfaces of the membrane.

19. The composite of claim 12 wherein said porous coating is disposed on both surfaces of the membrane.

20. A solid electrolyte ion transport membrane composite for separating a gaseous species from a gaseous mixture comprising:

a dense membrane having a first surface and a second surface, the membrane comprising 1) a matrix material which conducts at least one type of ion, and 2) at least one membrane constituent which is physically distinct from the matrix material, enhances at least one of the mechanical properties, catalytic properties and sintering behaviors of the matrix material, and is presented in a manner which precludes continuous electronic conductivity through the membrane constituent across the membrane;

a porous coating, comprised of the same composition as the dense membrane, being disposed on at least one surface of the membrane to enhance the rate of surface reactions involving the gaseous species; and at least one of the dense membrane and the porous coating being disposed on a porous support for enhancing the structural stability of the membrane.

* * * * *